No. 827,754. PATENTED AUG. 7, 1906.
C. RUST, Jr.
MANIFOLDING SHEET FOR LOOSE LEAF BOOKS.
APPLICATION FILED FEB. 20, 1905.

UNITED STATES PATENT OFFICE.

CONRAD RUST, JR., OF INDIANAPOLIS, INDIANA.

MANIFOLDING-SHEET FOR LOOSE-LEAF BOOKS.

No. 827,754.

Specification of Letters Patent.

Patented Aug. ...

Application filed February 26, 1906. Serial No. 243,596.

*To all whom it may concern:*

Be it known that I, CONRAD RUST, Jr., of Indianapolis, county of Marion, and State of Indiana, have invented certain new and useful Manifolding-Sheets for Loose-Leaf Books; and I do hereby declare that the following is a full, clear, and exact description thereof, reference being had to the accompanying drawings, in which like numerals refer to like parts.

The object of this invention is to improve the means of transferring items from bill-heads and the like to record-sheets, particularly for binding in loose-leaf binders.

My invention consists in providing convenient means for temporarily securing the bill-head upon the record-sheet while it is being put through the type-writer in order that the two may be held together relatively in the exact and proper position to transfer accurately and properly the items to the record-sheet.

The specific manner in which I prefer to carry out this invention consists in providing a detachable marginal portion for each of said sheets connected thereto along a weakened or perforated line and one of said marginal portions being gummed, so that it may be readily secured to the marginal portion of the other sheet. After the sheets have been written upon or put through the type-writer the bill-head is detached, leaving its marginal portion adhering to the marginal portion of the record-sheet. After the record-sheet is full, or at the end of the month or period, its marginal portion is also detached, together with the marginal portion from the bill-heads adhering thereto.

The full nature of the invention will be understood from the accompanying drawings and the following description and claims.

In the drawings, Figure 1 is a plan view of the upper portion of a record-sheet with a bill-head secured thereupon. Fig. 2 is a plan view of the bill-head in blank with one end folded over to show that it is gummed. Fig. 3 is a plan view of the record-sheet after being filled and with its marginal portion detached.

In detail, 10 represents a record-sheet, with holes 11 along the left-hand edge to enable it to be bound in a loose-leaf binder and with a narrow marginal portion 12 along the opposite edge separated by a row of perforations.

Bill-heads 13 are provided, ruled to correspond with the ruling of the record-sheet and having along one edge a marginal portion 14, corresponding with the marginal portion 12 and of the same width. One of these marginal portions is gummed, preferably the one on the bill-head, as shown in Fig. 2, so that by moistening the same it can be secured to marginal portion 12 of the record-sheet, and thereby the bill-head will be held in the exact place desired on the record-sheet. The perforations 15 of the two sheets when aligned accurately locate the bill-head, so that the rulings of the two sheets will correspond. After the sheets are in this combined condition with the aid of manifolding or carbon paper one can enter the items on the bill-head by hand or with a type-writer, and during such operation the two sheets will be held together in proper position, so that the entries on the record-sheet will be in proper places. After this is done the bill-head is detached from its marginal portion, which is left adhering to the marginal portion 12 of the record-sheet, and this process is repeated, subsequent bill-heads being secured to the same record-sheet and being placed successively lower on the latter until it is filled, as shown in Fig. 3. By that time there will be a considerable number of the marginal portions 14 of the bill-head adhering to the marginal portion 12 of the record-sheet, as shown at the right hand of Fig. 3. After the latter is filled, as in Fig. 3, its marginal portion 12 is detached, as therein shown, leaving the record-sheet free from the marginal portions and clean, ready to be bound. In using this combination of sheets further accuracy of alinement and position is obtained for the entries of each successive item, invoice, or charge on the record-sheet by placing an indicating mark, such as "x," (shown in the drawings,) opposite the total extension or last line on said sheet. When succeeding bill-heads are to be temporarily affixed to the record-sheet, the mark "x" acts as a guide to indicate the exact position the bill-head shall occupy by placing the latter sheet so that the words "Sold to" or any other indicator will be opposite the mark "x" on the record-sheet, this being easily accomplished, because the mark "x" is in such a position on the record-sheet as to be at all times exposed to view.

I do not wish to be limited to the particular manner of securing the sheets together nor of making the marginal portion.

What I claim as my invention, and desire to secure by Letters Patent, is—

1. The combination of a record-sheet having a marginal portion connected therewith along a weakened line at the lateral edge thereof, and a bill-head with a similar marginal portion gummed for securing it to the marginal portion of the record-sheet, whereby the bill-head may be readily secured to the record-sheet for manifolding purposes and be readily removable from said marginal portion and the marginal portion be readily removable from said record-sheet.

2. The combination of a record-sheet having a marginal portion connected therewith along a weakened line at the lateral edge thereof and being suitably ruled, and a bill-head with a similar marginal portion and similar ruling, the marginal portion of the bill-head being gummed on the back for securing the marginal portion of the bill-head to the marginal portion of the record-sheet.

3. The combination of a record-sheet having a marginal portion connected therewith along a weakened line at the lateral edge thereof, and bill-heads having each a marginal portion similar to that of the record-sheet and gummed for securing the same to the marginal portion of the record-sheet, said bill-heads being shorter than the record-sheets, so that the marginal portions of a number of the bill-heads may be successively attached to the marginal portion of the record-sheet, so as to overlap each other, substantially as set forth.

In witness whereof I have hereunto affixed my signature in the presence of the witnesses herein named.

CONRAD RUST, JR.

Witnesses:
W. F. BONHAM.
N. ALLEMONG.